2,754,302

2-6-DIMETHYL-4-PYRIDINOL-PHOSPHORIC ACID ESTERS

Hans Gysin and Alfred Margot, Basel, Switzerland, assignors to J. R. Geigy A. G., Basel, Switzerland, a Swiss firm No Drawing. Application April 4, 1952,
Serial No. 280,662

Claims priority, application Switzerland April 20, 1951

3 Claims. (Cl. 260—297)

The present invention concerns new phosphoric acid esters of the general formula:

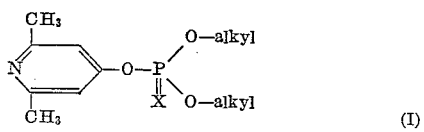

wherein X represents a member selected from the group consisting of oxygen and sulphur, and wherein each alkyl group contains a maximum of five carbon atoms.

It has now been found that such compounds have a very good insecticidal and acaricidal activity and, as active ingredients, are excellently suitable for the production of agents for the control of pests, in particular for the control of aphids and acarids. The new compounds are active both as contact poisons and systemic insecticides. They are distinguished from the most active aromatic aliphatic phosphoric acid esters such as p-nitrophenyl-diethyl-thiophosphoric acid ester partly by their slighter toxicity to warm blooded animals and partly by their stronger systemic action.

Many of the compounds according to the present invention have a cholinesterase-inhibitant action and are suitable, therefore, for the production of pharmaceutical preparations.

The new compounds can be produced by reacting an aliphatic phosphoric acid diester halide or a thiophosphoric acid diester halide of the general formula:

$$\text{Hal}-P\begin{array}{c}\diagup\text{O—alkyl}\\\|\\X\diagdown\text{O—alkyl}\end{array}\quad(II)$$

wherein Hal represents chlorine or bromine and X and alkyl have the meanings given above, with 2,6-dimethyl-4-pyridone or with a salt of the enol form of this compound.

The reactions may be performed in either the presence or absence of inert solvents such as benzene, toluene, dioxane, acetic acid ethyl ester. It is advantageous to add acid binding agents such as sodium or potassium carbonate when free heterocyclic compounds are used. The alkali salts, and also e. g. the salts of monovalent heavy metals are particularly suitable as salts of the enol forms.

In particular, compounds derived from alkanols with 1 to 5 carbon atoms come into question as phosphoric acid diester halides of the general Formula II. As alcohols may be named for example: methanol, ethanol, n-propanol, isopropanol, butyl alcohols and amyl alcohols.

Some of the phosphoric acid diester halides are already known. The others can be produced in an analogous manner, e. g. by reacting phosphorus oxyhalides or phosphorus thiohalides with 2 mols of the corresponding alcohols or mercaptans or metal compounds thereof or some may be produced by sulphurisation of the corresponding phosphorus acid diester halides.

As individual phosphoric acid diester halides may be listed: phosphoric acid or thiophosphoric acid dimethylester chloride, -diethylester chloride, -diethylester bromide, -dipropylester chloride, -di-isopropylester chloride, -diamylester chloride.

The following examples illustrate further the production of the new compounds. Parts are always given as parts by weight and the temperatures are in degrees centigrade.

EXAMPLE 1

12.3 parts of γ-lutidone are added to a solution of 2.3 parts of sodium in 150 parts of abs. ethanol. 20 parts of di-isopropyl phosphoric acid chloride are added to the solution of the sodium salt of γ-lutidone so obtained and the whole is boiled under reflux for 9 hours. After cooling, the sodium chloride which has precipitated from the solution is filtered off and the alcohol is removed from the filtrate in the vacuum. Any remaining γ-lutidone can be removed by shaking out with water. The [2.6-dimethyl pyridyl-(4)]-di-isopropyl phosphoric acid ester obtained is suitable without further purification for the production of agents for the control of pests. The ester can be distilled in a high vacuum. B. P.$_{0.3}$ 123°.

It is advantageous to condense the sodium salt of γ-lutidone with phosphoric acid diester chloride in an inert gaseous atmosphere, e. g. in a nitrogenous atmosphere.

The compounds shown in the following table can be produced in an analogous manner. Some of the phosphoric acid esters can be distilled in a high vacuum without decomposition, the boiling points are given in these cases. On the other hand only a few of the thiophosphoric acid esters can be distilled.

Table

General formula:

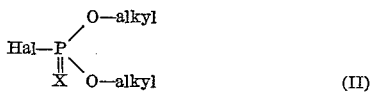

| No. | X | alkyl | Boiling Point | |
|---|---|---|---|---|
| | | | mm. Hg | ° C. |
| 1 | O | C$_2$H$_5$ | 0.2 | 118–120 |
| 2 | O | C$_4$H$_9$ | 0.1 | 150 |
| 3 | S | C$_2$H$_5$ | | |

The biological properties of the new compounds can be applied in the most varied fields of pest control and the nature of the compositions used can be varied accordingly. The active compounds can be used as such, e. g. in the form of powder or dispersed in the atmosphere as gas, mist or smoke. However, for most purposes it is more economical to combine them with suitable carriers or diluents. A number of such substances, suitable for the usual forms of application such as compositions for dusting or spraying (suspensions), solutions, aerosols, emulsions and semi-solid preparations (ointments) are listed below:

Thus as solid, pulverulent carriers may be used, e. g.: calcium carbonate in the form of whiting or ground limestone, koalin, bole, bentonite, talcum, powdered magnesia, kieselguhr, boric acid, tricalcium phosphate, also powdered wood, powdered cork and other materials of a vegetable nature. By adding wetting agents and protective colloids such pulverulent preparations may be made to give suspensions in water suitable for use as spraying agents. The active substances may be combined with the carriers by, e. g., impregnating the latter with solutions of the active agents, by mixing the liquid active substances with the carriers or by milling the components together.

Solutions (for spraying) in high boiling solvents, such as kerosene and similar mineral oil fractions or in methylnaphthalenes, xylenes and the like, are best suited for the direct spraying of the object treated, but also for impregnating wood. Solutions in low boiling solvents such as trichlorethylene, tetrachlorethane, ethylene chloride are suitable for spreading the active ingredient in the form of a mist. The latter solvents as well as, e. g. benzine, xylene and chlorobenzene are also suitable in the impregnation of packing materials.

Fluoro-trichloromethane and difluoro-dichloromethane are examples of solvents and propellant agents suitable for use in aerosols.

As emulsifying agents there come into consideration those of a cation active nature, such as quaternary ammonium compounds, as well as anion active agents such as soap, resin soap, soft soap, caseinate, aliphatic monoesters of sulphuric acid and aliphatic aromatic sulphonic acids, furthermore, non-ionogenic emulsifiers such as high molecular condensation products of ethylene oxide. They are mixed with the active ingredients to form emulsion concentrates or are emulsified to form dilutable emulsion concentrates with or without the addition of suitable solvents such as e. g. acetone, alcohols, cyclohexanone, benzene, toluene, xylene, tetrahydronaphthalene, alkylated naphthalenes, phthalic acid esters, mineral and vegetable oils and, if required, water.

White petroleum jelly and other ointment bases in which the active ingredient can be incorporated are suitable semi-solid extenders.

The active compounds may also be used together with attractives or lures such as sugar to form a bait, for instance as a dusting agent with sugar as the main carrier, or as sprays or fly catchers.

The different formulations can be better adapted for the various uses intended in the usual way, i. e., by the admixture of additives improving the distribution, adhesive power and resistance to rain on the treated surface. Examples of such additives are: fatty acids, resins, artificial resins, wetting agents, glue, casein, blood albumin, sulphite waste liquor or alginates. Similarly, their biological activity can be extended by the addition of substances with bactericidal, fungicidal or insecticidal properties.

As bactericides there come into consideration, for example, chlorinated phenols and quaternary ammonium compounds, suitable fungicides include e. g. sulphur in all its various forms of application such as lime sulphur liquid, copper compounds such as copper oxychloride or Bordeaux liquid, and fluorides. As examples of further insecticidal compounds there may be named: synthetic products like 1.1-bis-(p-chlorophenyl)-2.2.2-trichlorethane, γ-hexachlorocyclohexane, hexaethyl tetraphosphate, tetraethyl pyrophosphate, chlorinated camphene and 1.2.3.4.5.6.7.8.8-octachloro-4.7-methano-3a.4.7.7a-tetrahydroindane and 5.5-dimethyl-dihydroresorcinol dimethyl carbamate; suitable vegetable products are pyrethrin and rotenone.

In the following examples, parts are always given as parts by weight.

EXAMPLE 2

*Dusting agent.*—1 part of active ingredient is homogeneously ground with 99 parts of a carrier such as e. g. talcum. If desired, adhesives to improve the adhesive properties of the dusted coating on plants may be added.

EXAMPLE 3

*Suspension spraying agent.*—10 parts of active ingredient and 10 parts of solid puverised residue of sulphite waste liquor are homogeneously ground with 80 parts of carrier. Should a greater wetting action be required, the sulphite waste liquor residue can be replaced by 5 parts of the sodium salt of dibutylnaphthalene sulphonic acid and 5 parts of blood albumin. The carrier may consist of one or a mixture of several of the following substances: chalk, kaolin, bentonite etc.

EXAMPLE 4

*Emulsion.*—20 parts of active ingredient are dissolved in 40 parts of a solvent and mixed with 40 parts of an emulsifying agent. Mixture of benzene, toluene, xylene, acetone, lower aliphatic alcohols, petroleums may, for example, be used as solvent. The emulsifiers may be anion active, cation active or non-ionogenic. As examples may be given: sulphonates of fatty acid esters, the sulphonate of ricinoleic acid butyl ester, quaternary compounds or the condensation products of ethylene oxide and alkyl phenols or fatty alcohols. The concentrates can be emulsified into ready-for-use emulsions with water.

EXAMPLE 5

*Solution (spray).*—1 part of active ingredient either as such or after the addition of a solvent, e. g. an aromatic hydrocarbon, is dissolved in 99 parts of petroleum. (Boiling point 180–220°.)

What we claim is:

1. A phosphoric acid ester corresponding to the formula

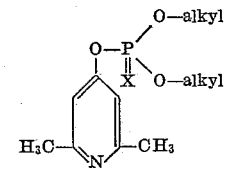

wherein each alkyl group contains a maximum of five carbon atoms, and X represents a member selected from the group consisting of O and S.

2. A phosphoric acid ester corresponding to the formula

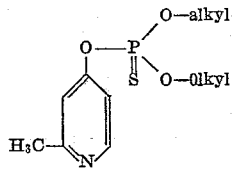

wherein each alkyl group contains a maximum of five carbon atoms.

3. A phosphoric acid ester corresponding to the formula

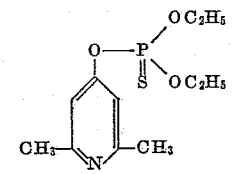

References Cited in the file of this patent

UNITED STATES PATENTS

| | | |
|---|---|---|
| 2,318,296 | Dickey | May 4, 1943 |
| 2,583,744 | Schrader et al. | Jan. 29, 1952 |

FOREIGN PATENTS

| | | |
|---|---|---|
| 666,596 | Great Britain | Feb. 13, 1952 |